Jan. 28, 1964    J. L. BONANNO    3,119,261
ANEMOMETER
Filed Jan. 2, 1962    2 Sheets-Sheet 1
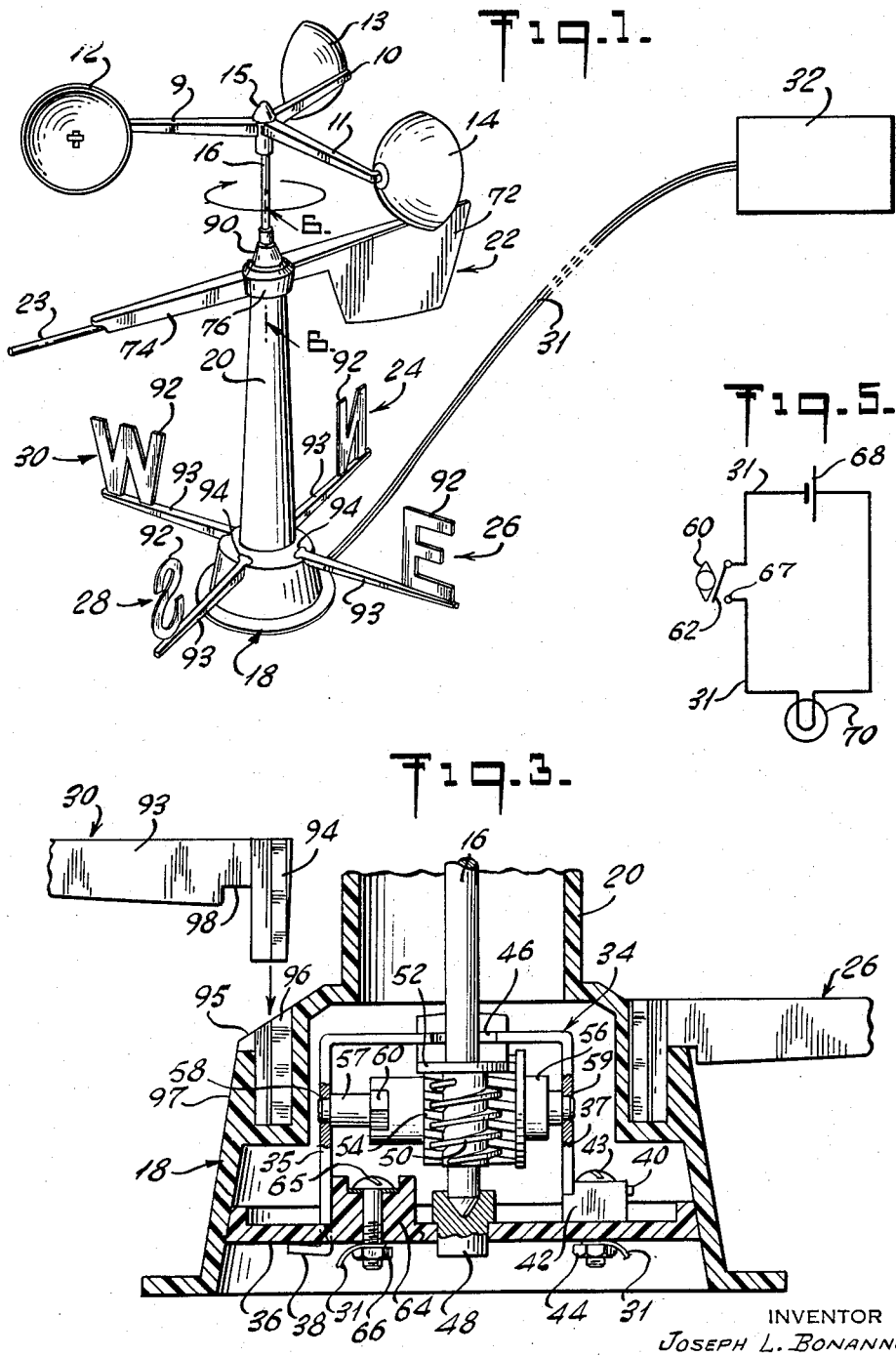
INVENTOR
JOSEPH L. BONANNO
BY
Moses, Nolte, & Nolte
ATTORNEYS

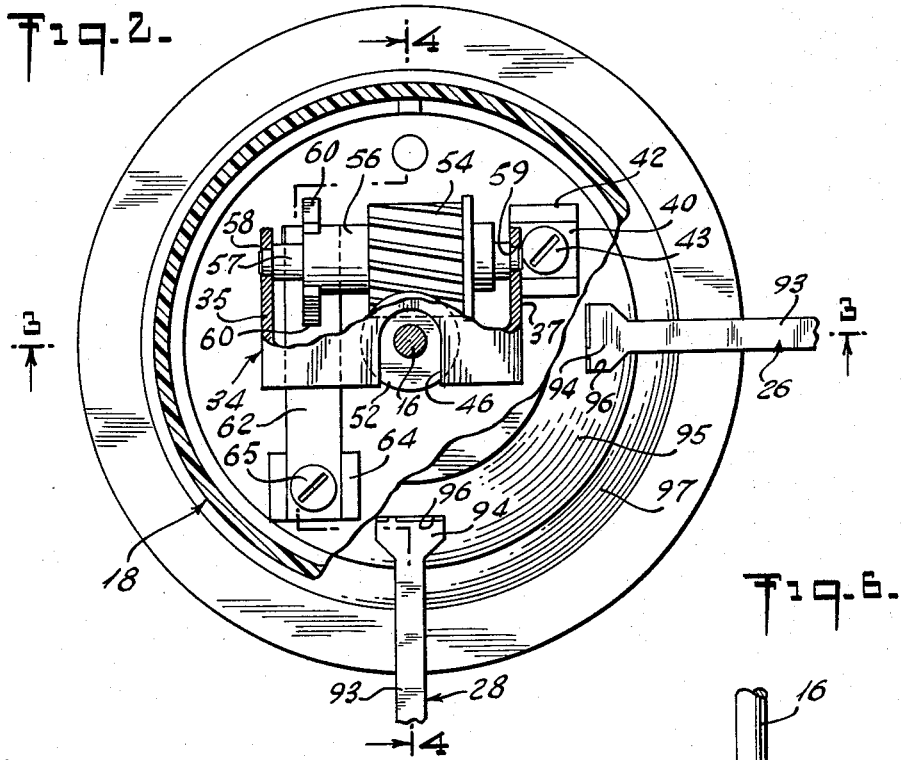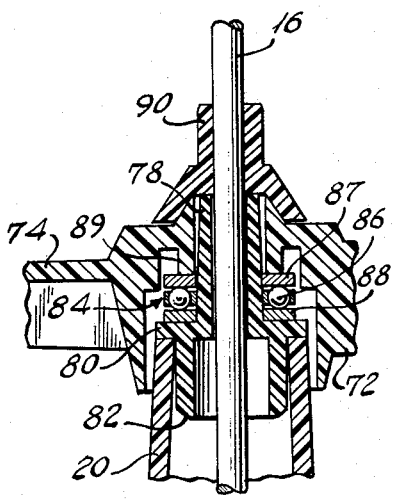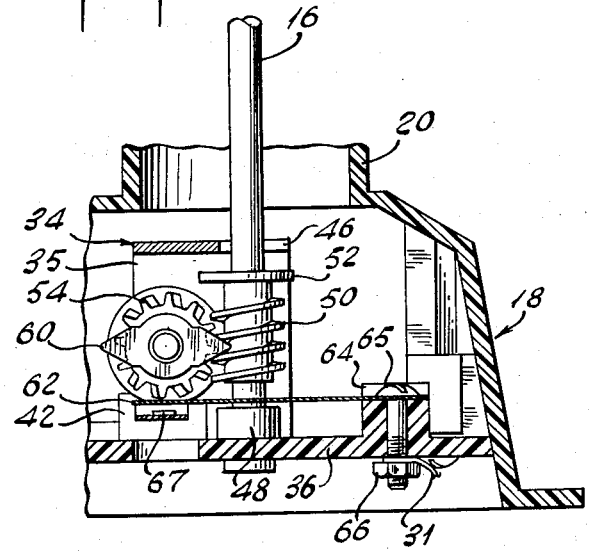
INVENTOR
JOSEPH L. BONANNO
BY
Moses, Nolte, & Nolte
ATTORNEYS

United States Patent Office 3,119,261
Patented Jan. 28, 1964

3,119,261
ANEMOMETER
Joseph L. Bonanno, South Orange, N.J., assignor, by mesne assignments, to Walter E. Heller & Company (Inc.), New York, N.Y., a corporation of Delaware
Filed Jan. 2, 1962, Ser. No. 163,445
3 Claims. (Cl. 73—189)

This invention relates to anemometers. More particularly, this invention relates to a particularly simplified anemometer which may be readily assembled by an adolescent for use as a plaything or as an aid in studying the science of meteorology.

An object of this invention is to provide a simplified anemometer capable of accurately indicating wind speed.

Another object is to provide an anemometer which may be sold in kit form and thereafter readily assembled by a child.

Still another object is to provide a simplified anemometer-wind vane combination capable of indicating wind speed and direction.

The objects of the invention are accomplished by providing a shaft which is rotatable in accordance with wind velocity. Through a gearing arrangement the rotating shaft actuates a cam member at a rate proportional to the angular velocity of the shaft. The cam member is operable to open and close an electrical circuit which includes an electric light. Since the light will flash at a rate proportional to the wind velocity, the light flashes may be counted over a given interval of time to determine the speed of the wind. In addition, a wind direction indicating means is provided, and the various direction indicators are mounted on the anemometer base in a simplified manner to facilitate construction of the device.

The manner in which the objects of the invention are accomplished will be more fully described with reference to the following specification and drawings, wherein:

FIG. 1 is a perspective view of the anemometer according to the invention;

FIG. 2 is a top view of the gearing assembly and electrical contacts of the invention;

FIG. 3 is a sectional view along the line 3—3 of FIG. 2;

FIG. 4 is a sectional view along the line 4—4 of FIG. 2;

FIG. 5 shows an electrical circuit which may be employed in the invention; and

FIG. 6 is a sectional view along the line 6—6 of FIG. 1, illustrating the supporting mechanism for the wind indicator.

Referring now to FIG. 1, the anemometer is shown comprising horizontal wind arms 9, 10 and 11, with wind cups 12, 13 and 14, respectively, attached thereto. If desired, the cups and arms may be manufactured separately and adapted to be readily assembled in any of a number of well known manners. Wind arms 9, 10 and 11 extend outwardly from a hub 15 to form one hundred twenty degree angles between adjacent arms.

Hub 15 is securely fixed by means of friction to a rotatable shaft 16, which is journaled in the anemometer base 18 in a manner to be described. A slightly-conical supporting column 20 extends upwardly from base 18, and is adapted to rotatably support a wind vane 22 in a manner also to be described below. A rod-like counterweight 23 balances wind vane 22 and also acts to point in the direction from which the wind is blowing. The various directions are manifested by direction indicators 24, 26, 28 and 30, positioned in base 18. Electrical leads 31 deliver a signal indicative of the wind speed to an indicating circuit 32, which may be located at a remote spot. The anemometer should be fixed to a post, or the like, so that it will be subject to the winds, and the indicating circuit may be located close by, or in a shelter.

The manner in which the invention generates such signals will now be explained in more detail with reference to FIGS. 2–4. The operating gear mechanism of the invention is supported by means of a U-shaped bracket 34 which is supported on a bottom plate 36 of the base 18. Plate 36 may be secured to base 18 in any desired manner such as, for example, by means of a conventional adhesive. One of the downwardly extending arms 35 of bracket 34 includes a hook-shaped pivot member 38 at its end, which is adapted to pass through a suitable opening in bottom plate 36, so that if the other vertical arm 37 is unsecured, the bracket can pivot thereabout. This is done for purposes of assembly, since it facilitates the construction of the invention. After hook member 38 has been inserted through the opening in bottom plate 36, a securing ear 40 of arm 37 may be secured to block 42 of bottom plate 36 by means of screw 43 and nut 44.

Bracket 34 is provided with a U-shaped cut-out portion 46 permitting shaft 16 to be rotatably supported in a cylindrical pivot member 48, which may be inserted into a suitable opening in bottom plate 36. A worm 50 is secured to shaft 16 towards the bottom extremity thereof, and a disc 52 is secured to shaft 16 at the top of worm 50. Disc 52 has a diameter greater than the width of the cut-out portion 46, and acts to prevent a lateral displacement of vertical shaft 16 by abutment against the interior surface of bracket 34. Worm 50 is arranged in operable engagement with a worm gear 54, which is mounted on an enlarged section 56 of a horizontal supporting rod 57. Shaft 57 is rotatably mounted in apertures 58 and 59 provided in the downwardly extending arms 35 and 37, respectively, of bracket 34.

A cam 60 is secured to the enlarged section 56 of shaft 57 and adapted to intermittently contact movable contact member 62. Movable contact 62 may be an elongated resilient member arranged parallel to bottom plate 56, and supported on mounting block 64 by means of screw 65 and nut 66. A stationary contact member 67 is arranged perpendicular to movable contact 62 so that the contacts will be closed when cam member 60 abuts against movable contact 62. Stationary contact 67 is supported on mounting block 42 along with securing ear 40 by means of screw 43 and nut 44.

In operation, wind will cause cups 12, 13 and 14 to rotate shaft 16 and worm 50 which is attached thereto. Worm 50 meshes with worm gear 54 so that shaft 57 also rotates, causing cam 60 to contact movable contact 62 and move it downwardly into engagement with stationary contact 67. The opening and closing of these two contacts may then be used to produce an indication of the wind velocity, since it is obvious that the rotation of cam 60, and thus the opening and closing of the contacts, is directly proportional to the angular velocity of shaft 16, which, in turn, is dependent upon wind velocity.

One type of circuit which may be used to produce such an indication is illustrated in FIG. 5. The electrical leads 31 which are secured in an electrically conductive relationship with contacts 62 and 67 via screws 65 and 43, respectively, are connected in a series circuit with a battery 68 and a light source 70. Contacts 62 and 67 are normally open, but when the wind causes the shaft 16 to rotate, the contacts are intermittently opened and closed by the rotation of cam 60. The opening and closing of the contacts will intermittently energize light 70 causing it to flash at a rate determined by the wind velocity. By counting the light flashes over a given period of time, it is possible to determine the actual velocity of the wind. For instance, by properly arranging the system constants, the number of light flashes in thirty seconds can be made to equal an extremely close approximation to the speed of the wind in miles per hour.

The anemometer may also be provided with means for indicating the direction of the wind. With reference now to FIGS. 1 and 6, a wind vane 22 is shown comprising a thin fin-like section 72 and an elongated nose portion 74 extending in opposite directions from a center or hub 76. Nose 74 may be of a generally U-shaped cross-section, and adapted to slidably receive a pointer or counterweight 23, which may then be radially adjusted to properly balance the indicating mechanism.

An upwardly extending trunnion 78 is supported by means of an annular collar 80 at the top of supporting column 20. A cylindrical sleeve 82 extends downwardly from collar 80 and serves to properly center trunnion 78 with respect to supporting column 20. A thrust bearing 84 is arranged on top of annular collar 80 and consists of ball bearings 86 situated in a known manner between an upper race 87 and a lower race 88. Hub 76 of wind indicator 22 includes a downwardly extending collar portion 89 which rotates about trunnion 78 and rests on upper race 87 of the thrust bearing. A rain shield 90 is secured to shaft 16 above trunnion 78 and hub 76 to prevent moisture from reaching the operating mechanism of the device.

The direction in which the pointer 23 of wind vane 22 is pointing is shown with reference to direction indicators 24, 26, 28 and 30. The four direction indicators are substantially identical in structure, and comprise a letter 92, representing one of the four directions, a supporting arm 93 and a mounting section 94. Base 18 is provided with a diagonal face 95 and a more steeply-sloped portion 97. The shape of the mounting portion 94 of the direction indicators is shown clearly in FIG. 2, and similarly shaped openings 96 are formed in the diagonal face 95 at ninety degree intervals. These openings extend slightly into the steeply-sloped face 97, and so arm 93 is provided with a notch portion 98 which receives the upper lip of face 97. It has been found that this construction greatly facilitates the assembly of the structure, permitting a young child to assemble his own anemometer with the barest minimum of tools.

Thus, the invention provides an anemometer of particular utility as a child's plaything, which, though inexpensive and simple to construct, provides an accurate indication of the speed and direction of the prevailing winds. Many modifications of the invention will be obvious to those skilled in the art and the invention should not be limited except as defined in the following claims.

What is claimed is:

1. An anemometer, comprising a plurality of wind cups detachably secured to the upper end of a shaft, a worm secured to the lower end of said shaft, a vertical elongated column including a base portion having a slot therein, a pivot member centrally located in said base portion, said shaft being rotatably supported in said pivot member to enable rotation of said shaft within the column, a generally U-shaped bracket including two downwardly extending vertical legs and a horizontal branch therebetween, one of said legs including a bent portion adapted to be pivotally supported in said base portion slot, a worm gear rotatably supported in said vertical legs in engagement with said worm, an external opening in an edge of said horizontal branch to enable positioning of the shaft in said pivot member, a disc secured to said shaft above said worm and adapted to engage the undersurface of said horizontal branch to limit vertical displacement of said shaft, a pair of elongated resilient electrical contacts adapted to be connected in an indicating circuit, each of said contacts being connected at one end to said base portion, and a cam secured to said worm gear and adapted to intermittently contact the free end of one of said contacts to open and close said circuit, whereby the number of circuit closures provides an indication of the wind velocity.

2. An anemometer according to claim 1, including a wind vane rotatably supported on the top of said column for indicating the wind direction.

3. An anemometer according to claim 2, wherein the lower portion of said column includes an inwardly indented portion having vertical slots therein adapted to receive wind direction indicators.

References Cited in the file of this patent

UNITED STATES PATENTS

| | | |
|---|---|---|
| 326,558 | Hirsh | Sept. 22, 1885 |
| 1,543,198 | Walters | June 23, 1925 |
| 2,104,373 | McNeil et al. | Jan. 4, 1938 |
| 2,142,951 | Mead | Jan. 3, 1939 |
| 2,491,176 | Hammond | Dec. 13, 1949 |
| 2,681,569 | Hirschoff | June 22, 1954 |
| 2,743,022 | Mapson | Apr. 24, 1956 |
| 2,969,672 | Sell et al. | Jan. 31, 1961 |

FOREIGN PATENTS

| | | |
|---|---|---|
| 372,204 | Great Britain | May 5, 1932 |
| 1,010,309 | France | Mar. 19, 1952 |